United States Patent [19]

Kuboyama

[11] Patent Number: 4,570,357
[45] Date of Patent: Feb. 18, 1986

[54] HEAT-TREATING PROCESS AND ITS APPARATUS IN REDUCING AIR PRESSURE WITHIN A CHAMBER

[76] Inventor: Nobuyoshi Kuboyama, 28-9-1, Shimomiyamori, Aza, Miyamori-Mura, Kamihei-Gun, Iwate-ken, Japan

[21] Appl. No.: 606,359

[22] Filed: May 2, 1984

[51] Int. Cl.$^4$ .............................................. F26B 3/04
[52] U.S. Cl. .......................................... 34/15; 34/35; 34/86; 34/92
[58] Field of Search .......................... 34/92, 15, 35, 86

[56] References Cited

U.S. PATENT DOCUMENTS 4,169,321 10/1979 Nichols ................................... 34/86
4,319,408 3/1982 Kuboyama ............................. 34/92

Primary Examiner—Larry I. Schwartz
Attorney, Agent, or Firm—Thomas R. Morrison

[57] ABSTRACT

This invention relates to a heat-treating process and its apparatus in reducing air pressure within a chamber, in which the outer air introduced into the chamber from the outside thereof is heat-exchanged with heated air within the chamber by actuating a heat-exchange means disposed in the airtight chamber and converted into the heated air, thereby the articles incorporated in the chamber may be heat-treated or dried effectively with no energy loss.

2 Claims, 1 Drawing Figure

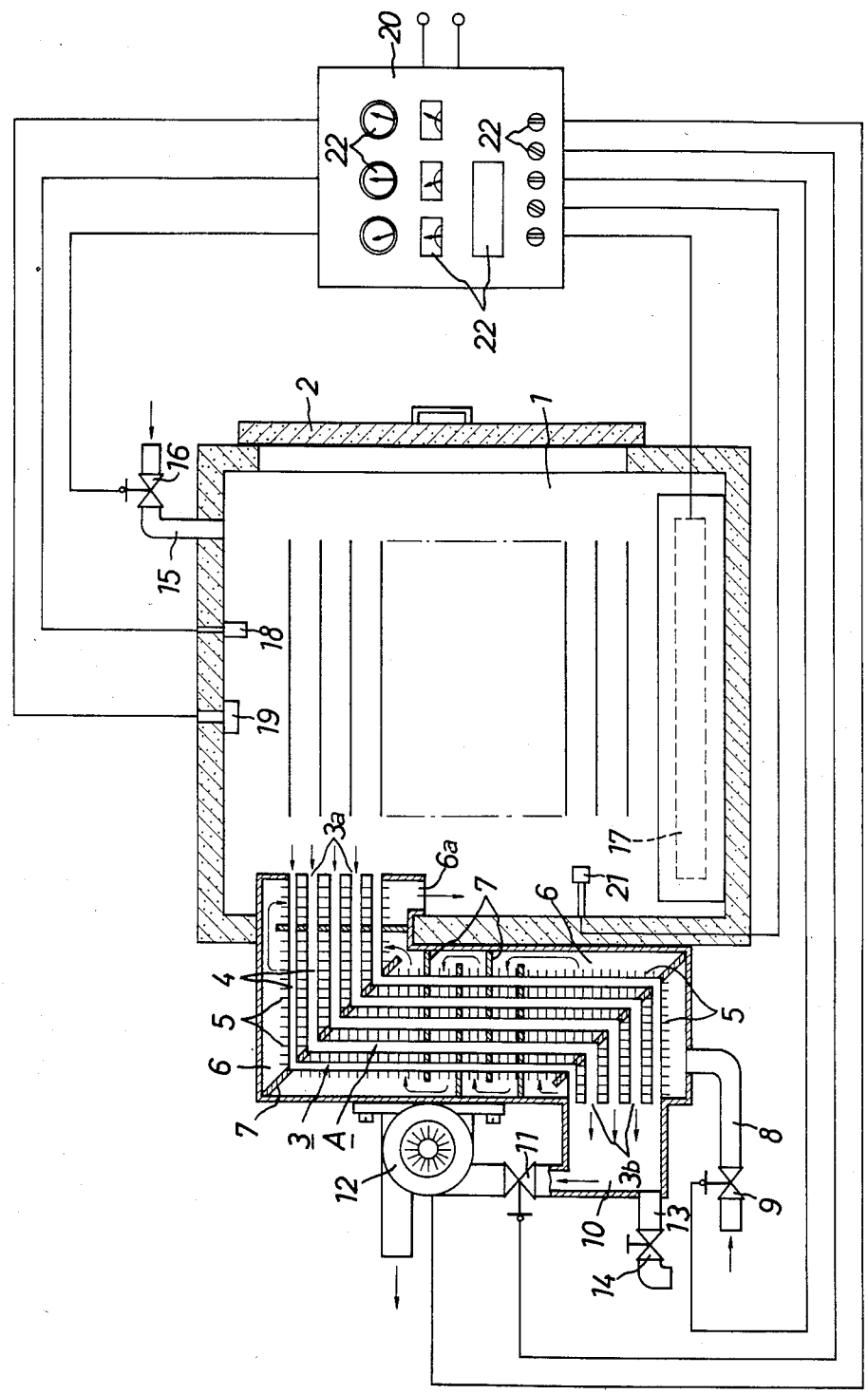

HEAT-TREATING PROCESS AND ITS APPARATUS IN REDUCING AIR PRESSURE WITHIN A CHAMBER

BACKGROUND OF THE INVENTION

This invention relates to a heat-treating process and its apparatus in reducing air pressure within a chamber, which may attain very high efficiency with less heat loss.

The origin of this invention is based on Japanese Unexamined Patent Publication No. 57-144869 (Japanese Patent Application No. 56-29953 filed and invented by the present inventor), in which air within an airtight chamber is heated in reducing air pressure therein by means of suction means such as a vacuum pump and a heat source such as a heater. More specifically, by equilibrating a difference between the air pressure inside the chamber and a normal air pressure thereoutside while actuating an automatic valve, wet articles incorporated in the airtight chamber may be heated and dried effectively. Further, this prior technique may be applied for growing plants such as flowers, vegetables, fruits, etc.

In practice, by programming in advance the air pressure reducing condition, heating temperature and heating time in view of the kind, quantity, size and water-containing state of the articles to be treated, the heating operation most suitable for respective articles to be treated may be carried out in continuous drive. Accordingly, this process may be applied for various drying and heating purposes or for expediting growth of plants.

However, according to one aspect of this process, a thermal energy of hot air within the chamber is discharged wastefully thereoutside, while cold outer air is introduced into the chamber by way of an outer introducing pipe. As a result, when the hot air discharge function by the suction means and the cold outer air introducing function through the outer air introducing pipe are carried out simultaneously, the disadvantage of this process is that particularly in the winter season the temperature in the chamber is decreased rapidly, thereby the heating and drying operation becomes very inconvenient.

In particular, the wet articles such as medical plants, marine plants, flowers, etc. may be discolored or deteriorated in quality under the aforesaid heating and drying operation. Further, when expediting growth of plants, it becomes difficult to maintain the thermal energy in the chamber constantly. From this point of view, it is demanded to control the introduction of outer air accurately.

A further disadvantage of this process is that energy cost is incurred additionally due to energy loss.

BRIEF SUMMARY OF THE INVENTION

It is therefore a general object of this invention to provide a heat-treating process and its apparatus in reducing air pressure within a chamber, in which the cold outer air introduced into the chamber from the outside thereof is heat-exchanged with heated air within the chamber by actuating a heat-exchange means disposed in the airtight chamber and converted into the heated air, thereby the articles incorporated in the chamber may be heat-treated or dried effectively with no energy loss.

Other and further objects, features and advantages of this invention will be apparent from the following description.

ACCOMPANYING DRAWING

FIG. 1 is a section view of an example of a heat-treating apparatus in reducing air pressure within a chamber according to this invention.

DETAILED DESCRIPTION OF THE INVENTION

A preferred example of this invention will now be described with reference to the accompanying drawing.

Numeral 1 is an airtight chamber having a door 2. The airtight chamber 1 is shielded by two external walls, between which is preferably incorporated a heat insulating material. Numeral 3 is a discharge passage disposed along the outside or inside (not illustrated) of the chamber. Each of the discharge passages 3 consists of a large number of conduits 4 disposed in parallel with each other. Each conduit 4 is of a small caliber and provided with a large number of heat-exchange fins 5. Numeral 6 is an outer air introducing passage formed concentrically in a tubular form along the outside of the discharge passage 3. Like the discharge passage 3, the outer air introducing passage 6 is provided with an opening 6a communicated with the chamber 1. The outer air introducing passage 6 is provided with a large number of stages 7 so that the outer air can be introduced in a zigzag form. Thus, a heat-exchange means A is obtained.

Numeral 8 is an outer air introducing pipe 8 communicated with the outer air introducing passage 6. The outer air introducing pipe is provided with a control valve 9 which may be actuated automatically or manually. Numeral 10 is a discharge pipe communicated with the discharge passages 3. The discharge pipe 10 is connected to a suction means 12 such as a suction motor by way of a control valve 11 which may be actuated automatically or manually. Accordingly, the air within the chamber 1 may be suctioned to outlets 3b from inlets 3a of the discharge pipe 10 by actuating the suction means 12, and finally discharged into the outer air by way of the discharge pipe 10. Consequently, the air pressure within the chamber 1 is reduced. The level of air pressure reduction may be controlled by regulating the suction force of the suction means 12 while considering the heat-treating degree of the articles. Generally speaking, a difference between a reduced air pressure within the chamber 1 and a normal air pressure thereoutside may be slight.

Numeral 13 is a drain pipe disposed at an end of the discharge pipe 10. In the process that a vaporized water content within the chamber 1 is passed through the discharge passages 3 and discharged outside the chamber 1, the water content (extracted liquid) cooled and coagulated by the heat-exchange means A can be discharged outside the chamber 1 by actuating the valve 14.

Numeral 15 is an air absorbing pipe directly communicated with the chamber 1. When cooling the interior of the chamber 1 rapidly, outer air may be introduced thereinto by opening automatically or manually a valve 16 connected to the air absorbing pipe 15. It is optional to dispose one or more air absorbing pipes 15. Numeral 17 is a heat source such as an infrared rays heater, an oil heater or the like that is disposed in the chamber 1. Numeral 18 is a temperature detecting element and numeral 19 is a pressure detecting element, both of which are disposed in the chamber 1 and connected to a controller 20 to be integrally formed with the chamber 1 or separated therefrom. By actuating the controller 20, a difference between the air pressure in the chamber 1 and an atmospheric pressure thereoutside may be controlled optionally. Numeral 21 is a humidity detecting element disposed in the chamber 1. Numeral 22 is an indicating/operating section having various measuring meters, timers, switches and program meters. Further, the suction means 12 and the control valves 9, 11 are also connected to the controller 20.

An operation of the heat-treating apparatus according to this invention will now be described hereinafter.

First of all, a preferred heating and drying program is preset by the controller 20 and actuated. Subsequently, the heat source 17 and suction means 12 are actuated and the air pressure within the chamber 1 reaches a preferred reduced level. Namely, the air in the chamber 1 is suctioned forcibly by the suction means and discharged thereoutside by way of the discharge passages 3 and the discharge pipe 10. In the meantime, the air temperature in the chamber 1 is raised rapidly by the heat source 17.

The degree of air pressure reduction in the chamber 1 is controllable optionally by regulating the suction force of the suction means 12, but when it reaches a suitably preset level, the suction means 12 stops actuation and the control valve 11 is closed, thereby the air pressure within the chamber reaches a preferred reduced level.

By providing the heat-treating process while reducing the air pressure within the chamber 1, the articles therewithin are heat-treated or dried effectively.

When the degree of air pressure reduction within the chamber 1 is declined less than a preset level, the suction means 12 is again actuated and the control valve 11 is opened, thereby an air pressure reducing operation is repeated.

By opening the control valve 9 of the pipe 8 communicated with the outer air introducing passage 6, cooled outer air is introduced into the passage 6 from the pipe 8, flows in a zigzag form along the large number of stages 7, passes between the large number of heat-exchange fins and is finally supplied into the chamber 1 by way of the inlet 6a. In that case, the cooled outer air is effectively heat-exchanged with the heated air passing through the discharge passages 3 by means of the heat-exchange means.

Thus, a heat energy within the chamber is not discharged wastefully outside the chamber and maintained therein, thereby the heated air therewithin is avoided from being cooled by the cold outer air.

The quantity of the heat-exchanged and heated air introduced by the outer air introducing passage 6 is depressurized at a balanced level by adjusting the opening degree of the control valve 9 suitably and actuating the suction means 12 continuously. Accordingly, the vaporized water content filled in the chamber 1 can be discharged immediately.

According to one aspect of this invention, in the case that the operation of the suction means and the opening/closing operation of the control valve are carried out mutually and the outer air is introduced intermittently, the cold outer air is of course heat-exchanged effectively with the heated air within the chamber, and heated thereby. At the same time, in the case that the control valve is open, the suction means is actuated continuously and the air discharge and outer air introduction are carried out simultaneously while maintaining a reduced air pressure within the chamber at a balanced level, the aforesaid heat-exchange process may be conducted.

Accordingly, the air temperature of the chamber is prevented from being decreased by the cold outer air, whereby a heat energy within the chamber may be employed effectively without any heat loss and the heat-treating (heating, drying or the like) time can be shortened largely. As a result, the present invention may attain a large energy-saving effect.

According to another aspect of this invention, since the temperature decline of the chamber is prevented, the quality of the dried articles is excellent. Thus, any articles incorporated in the chamber may be heattreated with high quality. From this point of view, this invention is very effective for expediting the growth of medical plants, marine plants, vegetables, fruits, flowers and other various plants.

What is claimed is:

1. A process for heat-treating at a reduced air pressure within an airtight chamber comprising:
   forcibly suctioning air from within said airtight chamber;
   maintaining a difference between said air pressure within said chamber and a normal air pressure thereoutside at a preferred preset level;
   heating said air within said airtight chamber to a preferred predetermined temperature by a heat source disposed therewithin;
   discharging a heated air having a vapor content from said airtight chamber;
   heat-exchanging cold outer air introduced into said airtight chamber from the outside thereof with a thermal energy of said heated air being discharged from said airtight chamber; and
   the step of maintaining a difference including controlling a control valve at an inlet end of an outer air inlet means to admit a controlled amount of outer air to said airtight chamber before the step of heat exchanging, whereby the pressure in said airtight chamber is controlled at said reduced air pressure and said controlled amount of air passing through said airtight chamber carries off said heated air having a vapor content from said airtight chamber.

2. Apparatus for heat-treating at a reduced air pressure within a chamber comprising:
   means, including a door, for making said chamber an airtight structure;
   a plurality of discharge passages communicated with said chamber;
   heat-exchange means including an outer air introducing passage communicated with said chamber;
   said plurality of discharge passages passing through said heat-exchange means;
   said heat-exchange means including means for heat exchange between air in said plurality of discharge passages and air in said outer air introducing passage;
   a first control valve in said outer air introducing passage upstream of said heat-exchange means;
   a suction means connected to said plurality of discharge passages;
   a second control valve in said suction means;
   a controller means for controlling said suction means, said first control valve, and said second control valve; and
   said first control valve being effective to admit a controlled flow of outer air to said heat exchange means which is sufficient to carry off heated air having a vapor content from said airtight structure but is small enough to maintain said reduced air pressure within said airtight structure.

* * * * *